United States Patent Office 3,781,396
Patented Dec. 25, 1973

3,781,396
METHOD OF MANUFACTURING SYNTHETIC RESIN-CEMENT PRODUCTS
Minoru Okuda, Satoru Aikawa, Hiromu Kaidzu, and Eiichi Tajima, Tokyo, Japan, assignors to Tajima Oyo Kako Co., Ltd., Tokyo, Japan
No Drawing. Filed Feb. 17, 1972, Ser. No. 227,260
Claims priority, application Japan, Feb. 26, 1971, 46/9,385
Int. Cl. B28c 5/00; B28b 3/12, 3/20
U.S. Cl. 264—140        5 Claims

ABSTRACT OF THE DISCLOSURE

A method of manufacturing products of synthetic resin-cement, which comprises the means of shaping a compound consisting mainly of a thermoplastic synthetic resin, cement, and sand and/or asbestos as the filler in addition thereto by kneading while applying heat, and the means of hardening the resulting products by heating while applying pressure in the presence of water.

BACKGROUND OF THE INVENTION

(a) Field of the invention

The present invention relates to a method of manufacturing products to serve as the construction materials which consist of the thermoplastic synthetic resin, cement and other fillers.

(b) Description of the prior art

The board-shaped and tubular cement manufactures such as asbestos cement board, concrete board, slate board, Eternit pipe and the like are very popular as various construction materials.

The strength of such materials are appropriately selected according to the use intended, but none of the conventional materials has so far proved to be fully satisfactory. The art of mixing some synthetic resin with cement is known in preparing a polymer cement or a resin concrete, and this art includes (1) the method wherein a latex or an emulsion of synthetic resin capable of retaining the elastic property within the concrete subsequent to execution of construction is employed, (2) the method wherein a water-soluble synthetic resin capable of satisfying the conditions for the foregoing method is employed, (3) the method wherein a reactive monomer capable of polymerizing within the alkaline solution of unhardened concrete and getting hard as the cement gets hardened is employed, (4) the method wherein the cement products are first impregnated with a polymerizable monomer and thereafter the monomer is polymerized, etc. However, all these methods except for (4) effect the hardening, during construction, at normal temperature under atmospheric pressure, and therefore, it is very difficult to mold in advance a board-shaped manufacture—particularly a thin board-shaped manufacture—and a tubular manufacture by these methods.

Meanwhile, some of the synthetic resins are possessed of an ample receptiveness for inorganic materials, so that it has been practiced to stabilize the quality of the synthetic resin products by making good use of this property, thereby bringing about the flame retarding effect of the material and the reduction of cost. For instance, a compound prepared by mixing polyvinyl chloride with such inorganic material as calcium carbonate, asbestos, etc. is made into sheet by applying heat and this sheet is cut square to serve as flooring tiles. The inorganic material employed for this purpose, however, has heretofore been limited to such one which will not get hardened through reaction with water.

In view of the foregoing facts, the inventors of the present invention have successfully prepared cement products further suitable for use as construction materials by applying specific synthetic resin to make the most of its characteristics and employing specific inorganic material which will not get hardened through reaction with water to thereby retain its properties.

SUMMARY OF THE INVENTION

The present invention provides a method of manufacturing products of synthetic resin-cement, which comprises the steps: shaping a compound consisting of a thermoplastic synthetic resin, cement, and sand and/or asbestos as the filler, by kneading while applying heat; and subsequently hardening the resulting products by heating while applying pressure in the presence of water, that is, together with water or saturated steam.

DESCRIPTION OF THE PREFERRED EMBODIMENTS

To give a further detailed explanation of the method of manufacturing the foregoing products, a composition prepared by mixing 100–150 parts by weight of a thermoplastic synthetic resin with 50–800 parts by weight of cement, 0–600 parts by weight of sand and 0–300 parts by weight of asbestos is subjected to either the process comprising 5–10 minutes' kneading of the compound while heating at 150–180° C. by means of, for instance, a horizontal-type dual mixing roll, rolling thereafter at a temperature of 100–150° C. by means of a vertical-type dual calendering-roll, and cutting the resulting sheet into pieces of desired size, or the process comprising granulating the compound by means of a continuous mixer and molding the resulting granules into the form of pipe or board having hollow portions therein by means of an extruding machine. The thus prepared sheet-shaped or pipe-shaped preliminary products are then put in a pressure furnace, such as an autoclave, together with water to subject them either to 3–10 hours' curing by applying a pressure of 8–20 kg./cm.$^2$ and a temperature of 170–300° C. or to 3–10 hours' curing by introducing saturated steam having a pressure of 8–20 kg./cm.$^2$ into pressure furnace together therewith, whereby there are readily obtained products having more flexural strength and less water absorbability than the conventional cement manufactures and being suitable for use as the roofing material, exterior wainscoting material, interior wainscoting material, flooring material, water pipe, etc.

Preparation of the conventional cement manufactures always requires water, entailing a long spell of curing and necessity for a spacious place. According to the method of the present invention, however, there is no necessity for mixing water at the time of preparing the composition, and the resulting products can be immediately carried or transferred. Therefore, it can enhance the productivity and deserves and provides an improved method of manufacturing products of this kind.

As the thermoplastic synthetic resin applicable in preparing the foregoing composition, polyvinyl chloride, polyethylene, polypropylene, ethylene-vinyl chloride, copolymer, ethylene-vinyl acetate copolymer, chlorinated polyethylene, ethylene-methyl acrylate copolymer, ethylene-ethyl acrylate, etc. can be employed individually or upon mixing as occasion demands.

The mixing rate of the components of the composition can be appropriately selected in the aforesaid ranges depending upon the intended use and desired performances of the product.

As the resin to be employed, a fresh material is of course preferable, but a material reclaimed from processed resin goods also will do.

In this connection, in case of applying polyvinyl chloride, it is advisable to employ jointly a stabilizer which is generally applied to a composition comprisinng vinyl chloride.

Further, there are instances where some antioxidant, ultraviolet inhibitor, lubricant as the processing aid, etc. are employed.

As the cement, any one of portland cement, portland blast furnace cement and silica cement will do, and white portland cement is also applicable.

As the sand, standard sand is best suited, but the ordinary river sand is also applicable.

As the asbestos, one of 7R-class or higher is preferable to ensure a sufficient strength. Further, there are instances where some calcium carbonate, clay, glass fiber, gypsum, organic fiber or the like is applied according to the requirement for performance of the product.

Besides, there are instances where such esters of organic acid having two or more of carboxyl radicals and/or esters of inorganic acid such as phosphoric acid, sulfonic acid, etc. which are popular as plasticizers for thermoplastic synthetic resin such as polyethylene, polystyrene, polyvinyl chloride, etc. are applied. The organic acid in said ester of organic acid having two or more of carboxyl radicals includes esters of oxalic acid, malonic acid, succinic acid, glutaric acid, adipic acid, pimelic acid, fumaric acid, maleic acid, phthalic acid, etc., and said esters of inorganic acid such as phosphoric acid, sulfonic acid, etc. includes triphenyl phosphate, tricresyl phosphate, phenyl alkylbenzensulfonate, cresol alkyl sulfonate, etc.

In this connection, the ester contained in the composition acts as a plasticizer during the hot kneading, and rapidly accelerates the hardening of cement as an acid arising from hydrolysis during the process of hardening by hydration. Fire resistance of the resulting products is such that, when the fire source is removed, there remains no flame at all and the smoke scarcely rises, thereby proving to be superior to the conventional products consisting of cement mixed with synthetic resin.

Both the compressive strength and flexural strength of the present products showed a numerical value of three times as much as that of a cement board, which verifies the superior quality of the present products.

Moreover, the ester employed in manufacturing the present products can be hydrolyzed at the time of processing for hardening by heating and partially recovered to be reused.

Example 1

A uniform composition prepared by subjecting a mixture of 50 parts by weight of chlorinated polyethylene, 50 parts by weight of ethylene-vinyl acetate copolymer and 500 parts by weight of cement/sand (=1/2) to 6 minutes' kneading at 170° C. by means of a mixing roll was molded into a 4 mm.-thick sheet through a vertical-type dual calendering-roll set at the temperature of 120° C. This sheet was cut into pieces of 3 feet x 6 feet, and the thus cut sheets were placed in an autoclave and subjected to 4 hours' curing by applying saturated steam of 10 kg./cm.$^2$ in pressure and 180° C. in temperature, whereby there were obtained sheets having such quality as shown in the following table. These sheets proved to have a compressive strength and a flexural strength superior to that of ordinary concrete products, and, in spite of the thinness thereof, be servable as the exterior wainscoting material, interior wainscoting material and roofing material.

Further, for the purpose of comparison, various boards were prepared by subjecting cement boards molded by pouring cement of standard composition in a mold to the same process of curing by means of autoclave as above.

Example 2

A composition prepared by subjecting a mixture of 100 parts by weight of polyvinyl chloride, 80 parts by weight of dibutyl phthalate and 900 parts by weight of cement/sand (=2/1) to 5 minutes' kneading at 170° C. by means of a mixing roll was molded into a 4 mm.-thick sheet through a vertical-type dual calendering-roll set at the temperature of 120° C. This sheet was cut into pieces of 30 cm. x 30 cm., and the thus cut sheets were placed in an experimental autoclave together with 500 cc. of water and subjected to 4 hours' curing by applying the pressure of 10 kg./cm.$^2$ and the temperature of 180° C., whereby there were obtained sheets having such quality as shown in the following table. The thus prepared sheets proved to be superior to an ordinary cement board and light concrete board in compressive strength, flexural strength and water absorbability.

On this occasion, it was found that the plasticizer applied got thermally decomposed, the phthalic acid accelerated the hydrolysis and could be recovered together with butyl alcohol upon completion of curing. It has been confirmed through quantitative analysis that the plasticizer got decomposed to the extent of two thirds of the amount originally applied.

As a result, the residual amount of organic substance within the sheet comes to be trifling so that combustion thereof scarcely gives rise to smoke, and therefore, this sheet proved to be of high safety as the exterior as well as interior wainscoting material.

Example 3

A composition prepared by subjecting a mixture of 50 parts by weight of ethylene-ethyl acrylate copolymer, 50 parts by weight of ethylene-vinyl chloride copolymer, 350 parts by weight of cement/sand (=1/2) and 100 parts by weight of asbestos to 5 minutes' kneading at 170° C. by means of a mixing roll was molded into a 4 mm.-thick sheet through a vertical-type dual calendering-roll set at the temperature of 115° C. This sheet was cut into pieces of 30 cm. x 30 cm., and the thus cut sheets were placed in an experimental autoclave of 25 l. in capacity together with 2 l. of water and subjected to 6 hours' heat-curing by applying the pressure of 8 kg./cm.$^2$ and the temperature of 175° C., whereby there were obtained sheets having excellent quality as shown in the following table. The thus prepared sheets proved to be superior to the conventional cement products in compressive strength, flexural strength and water absorbability and be possessed of strength equal to an asbestos slate board.

Example 4

A composition prepared by subjecting a mixture of 50 parts by weight of polyvinyl chloride, 30 parts by weight of polyethylene, 20 parts by weight of polypropylene and 500 parts by weight of cement/sand (=2/1) to 4 minutes' kneading at 160° C. by means of a mixing roll was molded into a 5 mm.-thick sheet through a vertical-type dual calendering-roll set at the temperature of 120° C. This sheet was cut into square pieces of 30 cm. x 30 cm., and the thus cut sheets were placed in an experimental autoclave of 25 l. in capacity together with 1 l. of water and subjected to 6 hours' heat-curing by applying the pressure of 8 kg./cm.$^2$ and the temperature of 175° C., whereby there were obtained sheets having excellent quality in terms of compressive strength and flexural strength as shown in the following table.

Example 5

A composition prepared by subjecting a mixture of 70 parts by weight of reclaimed polyvinyl chloride, 30 parts by weight of reclaimed polyethylene, 60 parts by weight of dibutyl phthalate, 500 parts by weight of cement/sand (=1/1) and 100 parts by weight of asbestos to 4 minutes' kneading at 150° C. by means of a mixing roll was molded into a 4 mm.-thick sheet through a vertical-type dual calendering-roll set at the temperature of 130° C. This sheet was cut into square pieces of 30 cm. x 30 cm., and the thus cut sheets were placed in an autoclave of 25 l. in capacity together with 2 l. of water and subjected to 6 hours' curing by applying the pressure of 7.5 kg./cm.² and the temperature of 170° C., whereby there were obtained sheets having excellent quality superior to an asbestos slate board as shown in the following table.

Example 6

A composition prepared by subjecting a mixture of 50 parts by weight of ethylene-methyl acrylate copolymer, 50 parts by weight of propylene-vinyl chloride copolymer and 300 parts by weight of cement/sand (=2/1) to 5 minutes' kneading at 160° C. by means of a mixing roll was molded into a 4 mm.-thick sheet through a vertical-type dual calendering set at the temperature of 120° C. This sheet was cut into square pieces of 30 cm. x 30 cm., and the thus cut sheets were placed in an experimental autoclave of 25 l. in capacity together with 1 l. of water and subjected to 6 hours' curing by applying the pressure of 10 kg./cm.² and the temperature of 180° C., whereby there were obtained sheets having excellent quality superior to an ordinary cement board and light concrete board as shown in the following table.

TABLE

|  | Compressive strength (kg./cm.²) | Flexural strength (kg./cm.²) | Water absorbability (percent) |
|---|---|---|---|
| Example 1: |  |  |  |
| Pre-curing | 1,400 | 140 | 1.9 |
| Post-curing | 2,000 | 200 | 1.8 |
| Example 2: post-curing | 970 | 178 | 1.8 |
| Example 3: post-curing | 1,200 | 280 | 1.6 |
| Example 4: post-curing | 800 | 170 | 2.0 |
| Example 5: post-curing | 1,800 | 300 | 1.6 |
| Example 6: post-curing | 740 | 160 | 1.4 |
| Comparative example: |  |  |  |
| Ordinary cement board | 320 | 80 | 12.6 |
| Asbestos slate board | 1,500 | 210 | 19.0 |
| Light concrete board | 40 | 10 | 12.3 |

What is claimed is:

1. A method of manufacturing a molded, synthetic resin-cement body, which comprises:
   (1) kneading and heating to a temperature of from 150 to 180° C., a water-free composition consisting essentially of
      (A) from 100 to 150 parts by weight of thermoplastic synthetic resin,
      (B) from 50 to 800 parts by weight of hydraulic inorganic cement, and
      (C) a filler
   to form a moldable composition
   (2) molding the composition to form a preliminary, molded, shape-retaining body, and
   (3) curing the molded body by heating same for from 3 to 10 hours, at a temperature of 170 to 300° C., at a pressure of 8 to 20 kg./cm.², in the presence of water or saturated steam.

2. A method according to claim 1, wherein said molding step comprises rolling said moldable composition into the shape of a sheet.

3. A method according to claim 1, wherein said molding step comprises rolling said moldable composition into the shape of a sheet, subdividing the sheet into granules, and extruding the resulting granules to form a tubular molded product.

4. A method according to claim 1, wherein said thermoplastic synthetic resin is at least one member selected from the group consisting of polyvinyl chloride, ethylene-vinyl chloride copolymer, propylene-vinyl chloride copolymer, ethylene-vinyl acetate copolymer, chlorinated polyethylene, ethylene-methyl acrylate copolymer and ethylene-ethyl acrylate copolymer.

5. A method according to claim 1, wherein said filler is at least one member selected from the group consisting of up to 600 parts by weight of sand and up to 300 parts by weight of asbestos.

References Cited
UNITED STATES PATENTS

| 3,526,691 | 9/1970 | Hawkins et al. | 264—294 |
| 2,311,233 | 2/1943 | Jaenicke et al. | 260—29.6 S |
| 2,508,414 | 5/1950 | Meyer | 264—175 |
| 2,289,787 | 7/1942 | Kaschke et al. | 264—323 |
| 3,354,099 | 11/1967 | Stegeman | 264—122 |
| 3,240,736 | 3/1966 | Beckwith | 260—29.6 S |

ROBERT F. WHITE, Primary Examiner

T. E. BALHOFF, Assistant Examiner

U.S. Cl. X.R.

264—234, 294, 331, 333, 349